P. P. STEWART.
Domestic Oven.
No. 18,024.                    Patented Aug. 18, 1857.
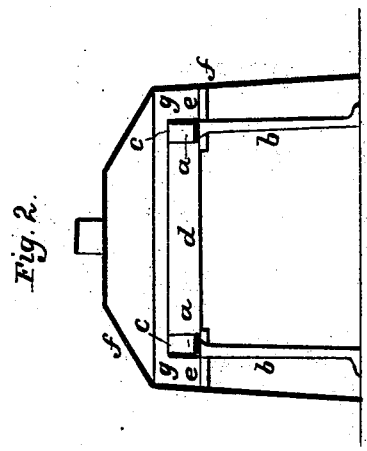
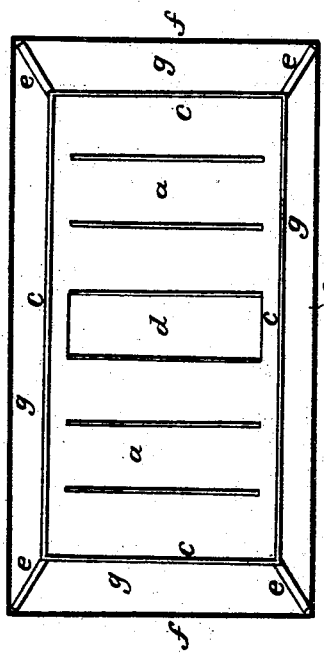
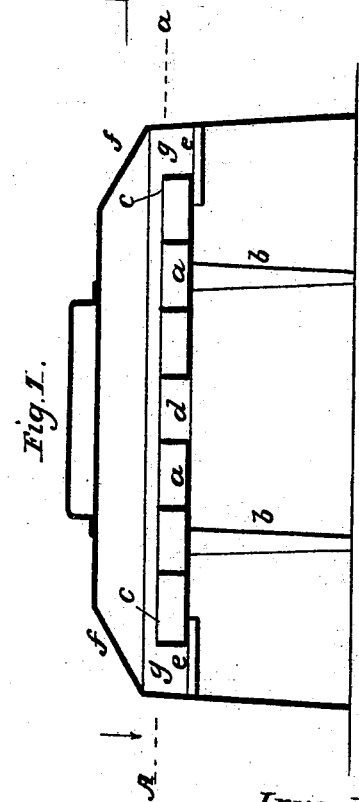
Witnesses:
G. M. Walker
S. T. Wiswell
Inventor.
P. P. Stewart

UNITED STATES PATENT OFFICE.

P. P. STEWART, OF TROY, NEW YORK.

BAKER FOR COOKING-STOVES.

Specification of Letters Patent No. 18,024, dated August 18, 1857.

*To all whom it may concern:*

Be it known that I, P. P. STEWART, of Troy, in the State of New York, have invented a new and useful Improvement in the Reflector-Bakers for Baking and Roasting on the Top of Cooking-Stoves, of which the following is a full, clear, and exact description, reference being had to the accompanying drawings, making part of this specification, in which—

Figure 1, is a longitudinal vertical, and Fig. 2, a cross vertical section; and Fig. 3, a horizontal section taken at the line A, a, of Fig. 1.

The same letters indicate like parts in all the figures.

My invention consists in the employment of a plate or pan surrounded by a rim and with feet to rest on the top plate of a stove, and provided with a slot or aperture in the middle of its length through which the heated air rises, when this is combined with a reflector which entirely incloses it over and around with a space all around for the circulation, that the heated air may ascend between the ends and sides of the plate or pan and the reflector, and through the slot or aperture in the middle of the plate to be reflected onto the articles to be baked or roasted placed on the said plate or pan, whereby I am enabled to bake or roast with more regularity than by any other reflecting baker before known.

In the accompanying drawings $a$ represents a plate of sheet or other metal, with legs $b$, $b$, to rest on the plate of a stove, and with a rim $c$ along the two sides and ends. This plate is made about double the length of its width, and in the middle of its length there is a slot $d$ extending across nearly its whole width. At each corner there is a projecting wire $e$ in the line of the miter, and these four wires project sufficiently to act as guides and fit within the angles of a tin reflector $f$ the lower edge of which rests on the plate of the stove, leaving a space $g$ all around the plate or pan $a$. The height of this reflector should be sufficient to reflect the heat down onto the articles to be baked or roasted placed on the plate or pan $a$.

From the foregoing it will be seen that the heat radiated upward from the stove plate will heat the bottom of the plate or pan $a$ while the heat radiated upward through the slot $d$ and the space $g$ all around will be reflected down on top of the articles to be baked or roasted.

What I claim, as my invention and desire to secure by Letters Patent, is—

The employment of the plate or pan with its legs to rest on a stove plate, its projecting wires at the angles to guide the reflector, and its aperture or slot in the middle of the length, in combination with the tin reflector inclosing the whole and leaving a space all around which, together with the slot in the middle of the plate or pan, will permit the heat radiated from the stove plate to be reflected onto the top of the articles to be baked or roasted, all substantially as specified.

P. P. STEWART.

Witnesses:
   MOSES WARREN,
   T. S. BANKER.